(12) United States Patent
Riedel

(10) Patent No.: US 10,419,667 B2
(45) Date of Patent: Sep. 17, 2019

(54) VIRTUAL WINDOWS FOR AIRBORNE VEHICLES

(71) Applicant: AIRBUS OPERATIONS GMBH, Hamburg (DE)

(72) Inventor: Christian Riedel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 38 days.

(21) Appl. No.: 15/274,101

(22) Filed: Sep. 23, 2016

(65) Prior Publication Data

US 2017/0094166 A1 Mar. 30, 2017

(30) Foreign Application Priority Data

Sep. 24, 2015 (EP) .................................... 15186718

(51) Int. Cl.
*H04N 5/232* (2006.01)
*B64D 11/00* (2006.01)
(Continued)

(52) U.S. Cl.
CPC ......... *H04N 5/23238* (2013.01); *B64D 11/00* (2013.01); *B64D 47/08* (2013.01);
(Continued)

(58) Field of Classification Search
CPC B64D 11/00; B64D 2011/0061; B64D 47/08; G06F 3/1431; G06F 3/1446;
(Continued)

(56) References Cited

U.S. PATENT DOCUMENTS

| 6,302,541 B1 | 10/2001 | Grossmann |
| 7,088,310 B2 * | 8/2006 | Sanford ................ A61M 21/02 345/7 |

(Continued)

FOREIGN PATENT DOCUMENTS

| CN | 1299564 A | 6/2001 |
| CN | 102893594 A | 1/2013 |

(Continued)

OTHER PUBLICATIONS

European Search Report for EP 15186718.1 dated Apr. 4, 2016.
(Continued)

*Primary Examiner* — Gelek W Topgyal
(74) *Attorney, Agent, or Firm* — Jenkins, Wilson, Taylor & Hunt, P.A.

(57) ABSTRACT

A virtual window assembly for an airborne vehicle includes at least one camera configured to capture a panoramic and time-resolved image data stream from the view to the outside of the airborne vehicle, an image data processor coupled to the camera and configured to receive the captured image data stream and split the image data stream into a plurality of partial image data streams corresponding to different viewing angles of the panoramic image data stream, and a plurality of electronic displays mounted to an inside of a hull of the airborne vehicle, coupled to the image data processor and configured to receive partial image data streams. Each of the electronic displays is configured to display one of the partial image data streams so that the physical mounting location of the electronic displays in the airborne vehicle corresponds to the associated camera viewing angle of the displayed partial image data stream.

13 Claims, 2 Drawing Sheets

(51) Int. Cl.
*B64D 47/08* (2006.01)
*G06F 3/14* (2006.01)
*H04N 5/265* (2006.01)
*H04N 7/015* (2006.01)
*H04N 7/18* (2006.01)

(52) U.S. Cl.
CPC .......... *G06F 3/1431* (2013.01); *G06F 3/1446* (2013.01); *H04N 5/23293* (2013.01); *H04N 5/265* (2013.01); *H04N 7/015* (2013.01); *H04N 7/18* (2013.01); *H04N 7/181* (2013.01); *B64D 2011/0061* (2013.01); *Y02T 50/46* (2013.01)

(58) Field of Classification Search
CPC .......... H04N 5/23238; H04N 5/23293; H04N 5/265; H04N 7/015; H04N 7/18; H04N 7/181; Y02T 50/46
See application file for complete search history.

(56) References Cited

U.S. PATENT DOCUMENTS

| | | | |
|---|---|---|---|
| 9,374,528 | B2 | 6/2016 | Watanabe et al. |
| 9,787,948 | B2* | 10/2017 | de Carvalho .......... H04N 7/183 |
| 2003/0076279 | A1 | 4/2003 | Schkolnik |
| 2004/0217976 | A1 | 11/2004 | Sanford |
| 2005/0001787 | A1 | 1/2005 | Montgomery et al. |
| 2005/0273823 | A1* | 12/2005 | Brady, Jr. ............ H04L 61/2038 725/76 |
| 2007/0077998 | A1* | 4/2007 | Petrisor .................. H04H 20/62 463/42 |
| 2008/0063398 | A1* | 3/2008 | Cline ....................... H04N 7/18 398/66 |
| 2008/0312778 | A1* | 12/2008 | Correa .................... H04L 67/12 701/3 |
| 2009/0195652 | A1 | 8/2009 | Gal |
| 2010/0007766 | A1* | 1/2010 | Ogawa ............... H04N 5/23232 348/229.1 |
| 2010/0188506 | A1 | 7/2010 | Dwyer et al. |
| 2010/0253917 | A1* | 10/2010 | Gao ..................... G02B 27/225 353/7 |
| 2010/0302347 | A1* | 12/2010 | Shikata .................. H04N 5/232 348/36 |
| 2011/0096136 | A1* | 4/2011 | Liu ........................ H04N 7/144 348/14.07 |
| 2011/0107377 | A1* | 5/2011 | Petrisor ............. H04L 12/40182 725/76 |
| 2012/0229462 | A1 | 9/2012 | Eichenlaub |
| 2012/0319870 | A1 | 12/2012 | Riedel et al. |
| 2012/0325962 | A1 | 12/2012 | Barron |
| 2013/0169807 | A1* | 7/2013 | de Carvalho .......... H04N 7/183 348/144 |
| 2014/0160285 | A1* | 6/2014 | Barrou ............... B64D 11/0015 348/144 |
| 2014/0347452 | A1* | 11/2014 | Smolic ................. H04N 13/139 348/54 |
| 2015/0035857 | A1* | 2/2015 | Lowe ..................... G09G 5/377 345/629 |
| 2015/0189256 | A1* | 7/2015 | Stroetmann ............. G06F 3/013 348/54 |
| 2015/0341677 | A1* | 11/2015 | Petrisor .............. H04N 21/6112 725/76 |
| 2015/0363656 | A1* | 12/2015 | Brauer .................. H04N 7/181 348/77 |
| 2016/0027160 | A1 | 1/2016 | Aydin et al. |
| 2016/0057355 | A1* | 2/2016 | Shimbo .................. H04N 5/247 348/239 |
| 2016/0086379 | A1* | 3/2016 | Sadi ...................... G06T 19/006 345/633 |
| 2016/0325836 | A1* | 11/2016 | Teo .................... B64D 11/0015 |
| 2017/0094167 | A1 | 3/2017 | Riedel |
| 2017/0098133 | A1* | 4/2017 | Brauer ............... G06K 9/00845 |

FOREIGN PATENT DOCUMENTS

| | | |
|---|---|---|
| CN | 202642101 U | 1/2013 |
| CN | 103793049 A | 5/2014 |
| CN | 103905794 A | 7/2014 |
| DE | 10 2004 027 334 A1 | 12/2005 |
| EP | 0913325 A1 | 5/1999 |
| EP | 2851281 A1 | 3/2015 |
| JP | 2000350195 A | 12/2000 |

OTHER PUBLICATIONS

European Search Report for EP 15186722.3 dated Apr. 8, 2016.
Non-Final Office Action for U.S. Appl. No. 15/274,116 dated Mar. 28, 2018.
Chinese Office Action for Application No. 2016108487556 dated Apr. 11, 2018.
Chinese Office Action for Application No. 201610848755.6 dated Feb. 20, 2019.
Non-Final Office Action for U.S. Appl. No. 15/274,116 dated Mar. 22, 2019.
European Office Action for Application No. 15186718.1 dated Jan. 9, 2018.
Summons to Attend Oral Proceedings for European Application No. 15186718.1 dated Jun. 7, 2018.
Second Chinese Office Action for Application No. 201610848755.6 dated Sep. 27, 2018.
Final Office Action for U.S. Appl. No. 15/274,116 dated Oct. 29, 2018.
Chinese Office Action for Application No. 201610908363.4 dated Nov. 23, 2018.
Chinese Office Action for Application No. 201610908363.4 dated Jun. 21, 2019.

* cited by examiner

VIRTUAL WINDOWS FOR AIRBORNE VEHICLES

CROSS-REFERENCE TO RELATED APPLICATION

This application claims priority to European Patent Application EP 15 186 718.1 filed Sep. 24, 2015, the entire disclosure of which is incorporated by reference herein.

TECHNICAL FIELD

The present disclosure relates to a virtualization of windows for airborne vehicles, specifically by gathering image and/or video data in the surrounding of an airborne vehicle and displaying the gathered image and/or video data on electronic displays within the airborne vehicle.

BACKGROUND

The design of small aircraft windows that is constrained by engineering considerations allows passenger of an aircraft only a limited view on the outside world. However, implementing windows in aircraft increases weight, drag, manufacturing costs and maintenance efforts for the aircraft. Thus, there is a conflict between engineering boundary conditions and the desire for a higher comfort of the passenger.

Several attempts have been made to improve this situation. For example, document US 2013/0169807 A1 discloses a virtual window including internal and the external aspects of a real window, with the internal part having a folded or flexible high resolution color display that conforms to the internal profile of the aircraft fuselage as if it were an actual window. Document US 2004/0217976 A1 discloses methods and systems for processing images corresponding to views external to a vehicle where first and second signal receiving portions are configured to receive a signal corresponding to an image of a view external to the vehicle and a signal processing portion directs to a first display portion a first signal corresponding to the image and to a second display portion a second signal corresponding to the image.

There is, however, a need for improved solutions that enable passengers of an airborne vehicle to enjoy a realistic panoramic view to the outside of an airborne vehicle, for example an aircraft cabin.

SUMMARY

A first aspect of the disclosure pertains to a virtual window assembly for an airborne vehicle, comprising at least one camera configured to capture a panoramic and time-resolved image data stream from the view to the outside of the airborne vehicle, at least one image data processor coupled to the at least one camera and configured to receive the captured image data stream and to split the image data stream into a plurality of partial image data streams corresponding to different viewing angles of the panoramic image data stream, and a plurality of electronic displays mounted to an inside of a hull of the airborne vehicle, coupled to the image data processor and configured to receive the plurality of partial image data streams. Each of the plurality of electronic displays is configured to display one of the plurality of partial image data streams so that the physical mounting location of the electronic displays in the airborne vehicle corresponds to the associated camera viewing angle of the displayed one of the plurality of partial image data streams.

According to a second aspect of the disclosure, an aircraft comprises a virtual window assembly according to the first aspect of the disclosure.

According to a third aspect of the disclosure, a method for displaying a view of the outside of an aircraft to passengers within the aircraft comprises capturing a panoramic and time-resolved image data stream from the view to the outside of the aircraft using at least one camera, transmitting the captured image data stream to at least one image data processor, splitting, by the at least one image data processor the image data stream into a plurality of partial image data streams corresponding to different viewing angles of the panoramic image data stream, and displaying the plurality of partial image data streams on a plurality of electronic displays mounted to an inside of a hull of the airborne vehicle so that the physical mounting location of the electronic displays in the airborne vehicle corresponds to the associated camera viewing angle of the displayed one of the plurality of partial image data streams.

One of the ideas on which the present disclosure is based is to gather panoramic and time-resolved image data with one or more cameras corresponding to a panoramic outside view to one side of an airborne vehicle and to split the gathered image data into partial data streams, with each partial data stream being delivered to one of a plurality of virtual window displays mounted to an inside of the airborne vehicle. The partial data streams may be processed to adjust a viewing angle of the camera with respect to realistic viewing angles of the respective virtual window displays.

An important aspect is that cameras with a plurality of angularly resolved viewing regions may be employed. Those viewing regions form the sources for the different virtual window displays, respectively. By appropriately dividing the captured image data of the camera into viewing regions and calculating a real-time stitching of neighboring virtual window displays based on the split image data, the plurality of virtual window displays may collectively display a panoramic view within the airborne vehicle, as if the hull of the airborne vehicle would be completely transparent in the region of the virtual window displays.

Such a virtual window assembly has several advantages: The usually small aircraft windows may be virtually enhanced in size so that passengers may have a sensation of enhanced sight to the outside. Therefore, the comfort of the passengers may be increased. Weight, aircraft drag, manufacturing costs and/or maintenance efforts associated with the design of physical aircraft windows may be decreased since aircraft windows may be kept small or even be dispensed with at all. Additional passenger seats may also be placed in fuselage sections like conical or bulk sections which usually do not easily allow for the installation of physical windows. In such sections, the passenger comfort may be upheld by providing the same virtual panoramic view to the outside as in other fuselage sections with actual physical windows.

According to an embodiment of the virtual window assembly, the at least one camera may comprise an ultra wide-angle lens camera. In one embodiment, the at least one camera may have an angle of view of approximately 180°. It may be possible to employ at least two such ultra wide-angle lens cameras, one for each side of the aircraft.

According to another embodiment of the virtual window assembly, the plurality of electronic displays may comprise first displays mounted along the side walls of the hull.

Optionally, the plurality of electronic displays may comprise second displays mounted with a viewing direction against the flying direction of the airborne vehicle. The first displays serve as virtual side windows allowing a view to the side of the airborne vehicle, while the second displays serve as virtual front windows allowing a view in flying direction as if the front of the airborne vehicle would be transparent.

According to another embodiment of the virtual window assembly, the plurality of electronic displays may each be configured to display image data in Ultra HD 4K or Ultra HD 8K. Such a high resolution advantageously allows for a realistic rendering of the captured image data so that the impression of a real transparent fuselage is improved. This raises acceptance of the virtual window assembly by passengers of the airborne vehicle.

According to another embodiment of the virtual window assembly, the image data processor may be configured to generate the plurality of partial image data streams with an overlap in viewing angles of the panoramic image data stream. In this case, the plurality of electronic displays may optionally be configured to display stitched partial image data streams. The stitching of the pictures on side-by-side displays enhances the panoramic impression the electronic displays are able to convey to a viewer. Specifically, stitching involves registering the images to be stitched, calibrating according to the overlapping common features therein and blending the overlapped images to remap the partial image data streams at their seams to yield an output projection. That way, imagery from different viewing angles of the panoramic data stream may be combined with overlapping fields of view in order to obtain a segmented panorama image to be stretched out over a series of side-by-side electronic displays.

According to another embodiment of the virtual window assembly, the image data processor may be integrated into a display module of one of the plurality of electronic displays. Decentralized image processing provides the advantage of less load on the aircraft data network due to heavy network traffic from the large quantities of image data to be transmitted and processed.

According to an embodiment of the aircraft, the image data processor may be integrated into a flight attendant control panel of the aircraft. Existing computing power in the flight attendant control panel may advantageously be used in processing the image data. Moreover, the integration with the flight attendant control panel allows for a modular and more flexible implementation of the virtual window assembly in the aircraft.

According to an embodiment of the aircraft, the plurality of electronic displays may be coupled to the image data processor in a daisy-chain network topology. Dairy chain wirings have the advantage of requiring less cable bundling and less routing length, thereby reducing the overall system weight while at the same time allowing for better synchronicity between the displays and reducing latency issues.

According to a further embodiment of the aircraft, the aircraft may further comprise at least one window formed in the fuselage of the aircraft, and an opaque window cover installed in the window with the at least one camera being arranged in a throughhole of the window cover. That way, for the display associated with the window in which the camera is installed, the computational effort needed to process and re-calculate the image data for that particular window is saved since the captured image data from the camera already corresponds to the view through that window. Specifically for Ultra HD resolution image data, this reduced effort amounts to a substantial decrease in computational power needed.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
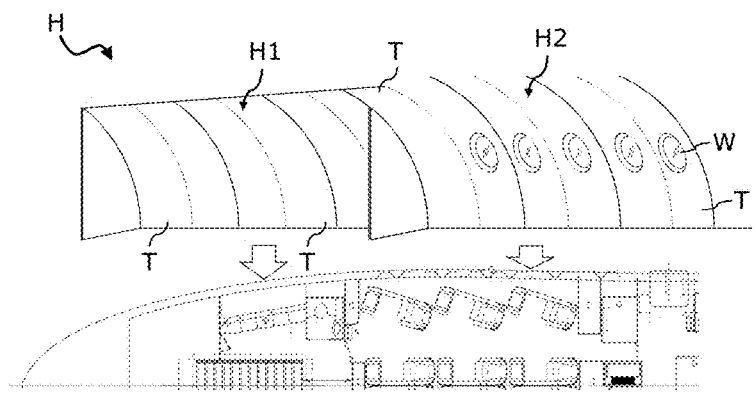
FIG. 1 schematically illustrates an exemplary part of a fuselage of an aircraft.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Electronic displays within the meaning of the present disclosure comprise any electronically controlled display device which is capable of optically conveying variable information to an onlooker. Electronic displays may for example include LED displays, OLED displays, LCD displays or similar.

Figure 2:
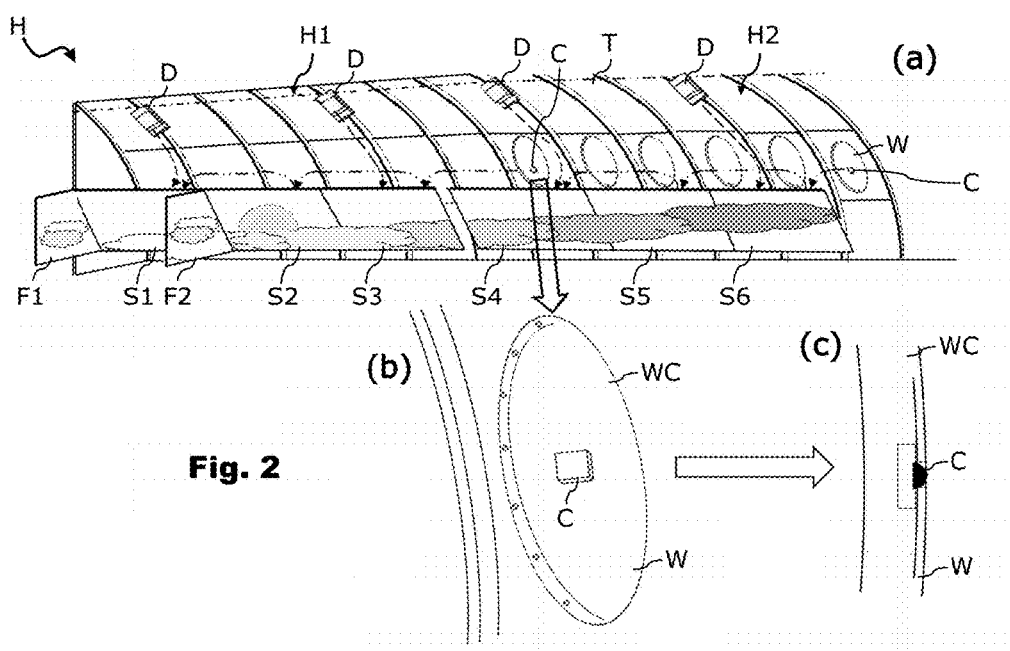
FIG. 2 schematically illustrates a virtual window assembly according to an embodiment of the disclosure herein.
Figure 3:
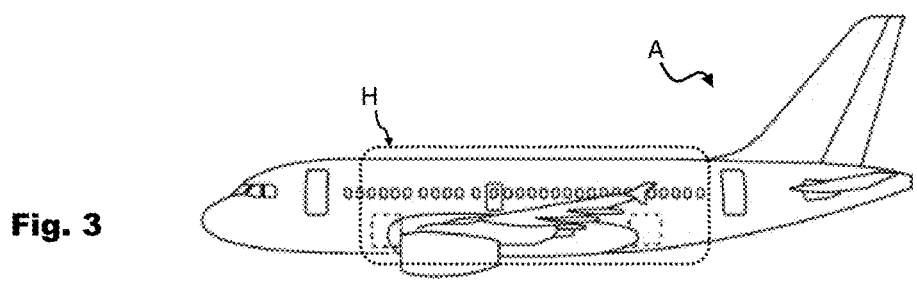
FIG. 3 schematically illustrates an aircraft having a virtual window assembly according to another embodiment of the disclosure herein.

FIG. 1 shows a schematic illustration of a portion H of a fuselage of an airborne vehicle as it may be for example be employed in the fore of an aircraft, particularly a passenger aircraft. FIG. 3 exemplarily depicts an aircraft A comprising such a fuselage H as explained and described in conjunction with FIGS. 1 and 2. Of course, other airborne vehicles such as helicopters, zeppelins or spaceships may be used with the virtual window assembly of the disclosure herein as well.

The fuselage H of an airborne vehicle may have different section H1, H2 which may be made by fuselage panels T. Some sections, as for example the section H1, may not have any physical windows installed in the panels T, while other sections, as for example the section H2, may have physical windows W installed in the panels T. Windowless sections H1 may for example be commonly found in conical or bulk sections in which the installation of windows is regularly complicated and expensive. Such windowless sections H1 may be interesting for airlines to implement with additional passenger seats, however, passengers' comfort and acceptance is highly impacted by the possibility to get a view of outside the aircraft.

As exemplarily illustrated in FIG. 2(a), both windowless sections H1 and sections H2 with windows W may be equipped with a virtual window assembly. The virtual window assembly includes at least one camera C that is configured to capture a panoramic and time-resolved image data stream from the view to the outside of the aircraft. The camera C may for example—as shown in FIG. 2(b)—be integrated into at least one window W which is formed in the fuselage H of the aircraft. The window W may be covered with an opaque window cover WC, for example an aluminum disc, that is installed in the window W. The camera C is then arranged in a throughhole of the window cover WC, as can be best seen in the side view of FIG. 2(c).

The camera C may then capture an outside view as a panoramic image data stream and transmit the captured images to an image data processor within the airborne vehicle. The image data processor receives the captured image data stream and splits the image data stream into a plurality of partial image data streams. The partial image data streams are associated with different viewing angles of the panoramic image data stream so that each partial image data stream may be transmitted to one of a plurality of electronic displays S which are mounted to an inside of the fuselage or hull H of the airborne vehicle.

Each of the plurality of electronic displays S is configured to display one of the plurality of partial image data streams so that the physical mounting location of the electronic displays in the airborne vehicle corresponds to the associated camera viewing angle of the displayed one of the plurality of partial image data streams. In other words, the viewing angles of the panoramic image data stream captured by the camera(s) C are processed and allocated to the electronic displays S depending on their position within the airborne vehicle. This facilitates a replacement of an optical view through physical aircraft windows W with a realistic panorama view to the outside of the aircraft cabin by a digital display of images on the electronic displays. Moreover, the digital view may even be extended to windowless fuselage sections H1 which would normally not allow a view to the outside of the aircraft.

The electronic displays S are exemplarily shown to be mounted side-by-side in a horizontal line along the extension of the fuselage, i.e. the electronic displays S may be arranged similarly to the physical windows W themselves mounted along the side walls of the fuselage H in order to create the illusion that the displays are actually windows. There may for example be side view virtual window displays S1 to S6 that create a panorama view with real-time stitched images over all displays. The field and side viewing angle may be similar to that of an aircraft window for all passengers over all displays. Additionally, there may be the option to provide front-side displays F1, F2 which are mounted with a viewing direction against the flying direction of the aircraft A, i.e. displays for a straight-on viewing direction in the direction of flight of the aircraft. Those front-side displays F1, F2 create the illusion for the passenger to be able to have unobstructed view through the cockpit to the surroundings in front of the aircraft.

The plurality of electronic displays S may each be configured to display image data in Ultra HD 4K or Ultra HD 8K, i.e. displays that have an aspect ratio of 16:9 and at least one digital input capable of carrying and presenting native video at a minimum resolution of 3840×2160 pixels. Specifically, Ultra HD 4K is a video format allowing a resolution of 3840 pixels wide by 2160 pixels tall, and Ultra HD 8K is a video format allowing a resolution of 7680 pixels wide by 4320 pixels tall.

The electronic displays S1 to S6 as well as possibly F1 and F2 may be configured to display a seamless panoramic picture to the onlooker. To that end, the image data processor may be configured to generate the plurality of partial image data streams with an overlap in viewing angles of the panoramic image data stream. That way, the partial image data streams may be stitched in real-time to create a seamless transition between neighboring side view virtual window displays S1 to S6 and/or between a side view virtual window display S1 to S6 and an adjacent front view display F1, F2.

The image data stream from the at least one camera C may for example be captured using a fisheye lens camera, i.e. a camera with an ultra wide-angle lens that produces strong visual distortion intended to create a wide panoramic or hemispherical image. Such a fisheye lens camera may for example have an angle of view of approximately 180°. Current camera technology allows for a chip sensor resolution of Ultra HD 4K or Ultra HD 8K over a viewing angle of 360°. If one ultra wide-angle lens camera C with a viewing angle of about 180° is employed for each side of the aircraft fuselage H, the resolution will be approximately half of the chip sensor resolution. The image data processor may include software that re-calculates image pixel duplicating to control the electronic displays with Ultra HD 4K technology. A real-time stitching procedure for neighboring displays ensures a panorama view over all displays.

Figure 4:
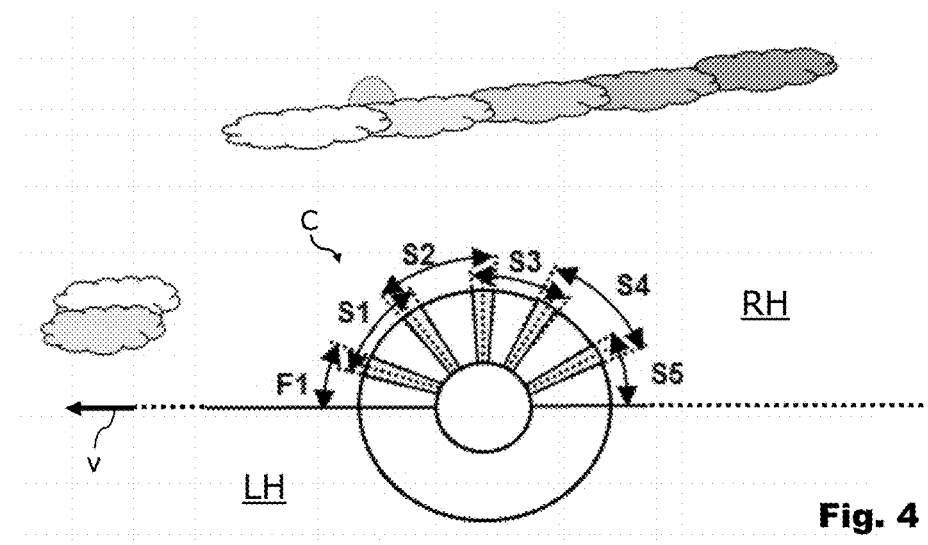
FIG. 4 schematically illustrates image capturing sectors of a camera for a virtual window assembly according to another embodiment of the disclosure herein.

The panorama view lens of the camera C is divided into different viewing areas, as exemplarily depicted in FIG. 4 for the right hand side RH of an aircraft. Such viewing areas may correspond to certain sensor regions of the camera chip sensor. By selectively reading out captured image data in dedicated sensor regions, image data streams of associated viewing areas may be obtained. The flight direction is indicated with the reference sign "v". Of course, for the left hand side LH, the viewing areas are formed analogously. Each of those viewing areas corresponds to one of the electronic displays (for example, F1 and S1 to S5) and forms the source of a partial image data stream. In some examples, an overlap at least 15% to 30% for each two neighboring viewing areas may be required in order to calculate the real-time stitching between the partial image data stream. This calculation may be performed by software, firmware and/or hardware in the image data processor. The real-time stitching and the pixel duplication may be processed in a frame buffer of the image data processor. The procedure for pixel duplicating calculation is limited by the size of the pixel areas of the camera chip sensor and the resolution of the electronic displays.

Crucial aspects that have to be considered in order to provide for real-time image performance are system latency and distribution of image data calculation tasks. Thus, it may be useful to provide a modular system that is expandable in a cascade. To that end, the image data distribution may be made in a daisy-chain arrangement of the electronic displays. Such a system may reduce the customizing effort for each aircraft and may be made available as a retrofit, line fit and stand-alone system. Moreover, a daisy-chain network topology may reduce the quantity of cable bundles and effort needed for routing.

In order to tackle system latency problems, image data may be transmitted directly and without coding, compression and/or packaging. It may be useful to provide for specific data distribution units D throughout the aircraft cabin which are interfaced with the displays via for example Ethernet, HDMI, Display Port or other video suitable interfaces. The data distribution units D may for example be part of an already existing cabin management system within the aircraft that is initially configured to transmit and distribute digital data information for cabin management functions through the aircraft cabin. Such a cabin management system may already provide for a high speed backbone data bus that is required to distribute the large amounts of image data of the virtual window assembly.

In the illustrated example of FIG. 2(c) the ultra wide-angle lens cameras C may be mounted in cut-outs of the aircraft windows W that are filled with suitable aluminum covers WC which may be similar in construction to the outside wall of the aircraft. The cameras C are then installed in the cut-out window covers WC so that the camera objective with a viewing angle of about 180° is mounted in the cut-out cover in a small hole of less than 5 mm diameter. It may be possible to use a camera C for each aircraft window W and one of the electronic displays may be installed in front of those windows. The captured image data stream may then be transmitted directly to the associated display. The decoding, re-calculating, processing and image stitching for the associated electronic display may in this case be performed decentralized, i.e. with a local image data processor installed within a display module of the electronic display. Additionally, the display module may be connected to a data distribution units D of the system so that further data for video functions, like for example viewing selection, Picture in Picture, rendered landscape simulation and/or augmented reality from and to a central data distribution module in the network may be transmitted and/or received. The neighboring electronic displays may additionally be connected in daisy-chain topology to exchange the image data streams of the different cameras. Furthermore, the electronic displays may have touchscreen functionality so that a passenger touching on parts of the electronic display may exert an influence on what is displayed, for example additional OSD information, brightness settings, contrast settings or similar.

Figure 5:
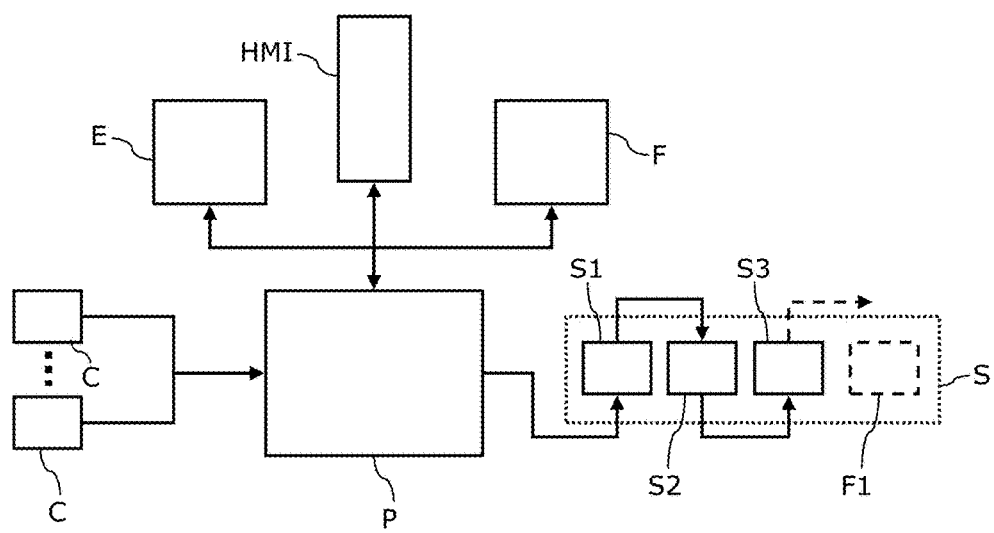
FIG. 5 schematically illustrates a processing environment for an aircraft having a virtual window assembly according to another embodiment of the disclosure herein.

FIG. 5 depicts a block diagram of a processing environment on board of an airborne vehicle that comprises a virtual window assembly. The processing environment may be employed for a virtual window assembly as shown and explained in conjunction with FIGS. 1 to 3 and may be installed in an aircraft A as shown in FIG. 4.

One or more cameras C, like ultra wide-angle or fisheye lens cameras C that are used to capture panoramic and time-resolved image data streams of the outside of the aircraft are coupled to an image data processor P. The image data processor P may be a stand-alone system or alternatively be integrated into another processing unit of the aircraft, for example a flight attendant control panel of the aircraft. A plurality of electronic displays S is coupled to the image data processor P, for example in a daisy-chain network topology. Of course, the plurality of electronic displays S may also be connected to the image data processor P in another network topology, for example in a cloud network or a star network.

The image data processor P may be embedded or otherwise integrated into existing aircraft cabin networks that may, inter alia, comprise In-flight entertainment (IFE) modules E, cabin management modules F and/or human-machine interfaces HMI. For example, the existing aircraft cabin network may be a cabin intercommunication data system (CIDS). The image data processor P may be equipped with a graphic processor having high-speed performance. Additionally, the image data processor P may be equipped with server functionality that may be a stand-alone server blade or be integrated into a HMI control panel of the aircraft network.

Figure 6:
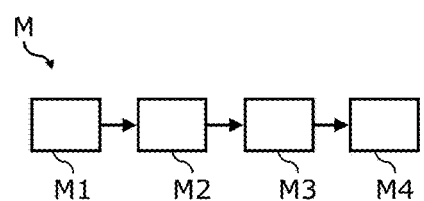
FIG. 6 schematically illustrates stages of a method for displaying a view of the outside of an aircraft to passengers within the aircraft according to another embodiment of the disclosure herein.

FIG. 6 schematically illustrates stages of a method M for displaying a view of the outside of an aircraft A to passengers within the aircraft A. The method M may for example be used in an aircraft A as shown in FIG. 3 and may make use of a virtual window assembly as explained in conjunction with the FIGS. 1, 2 and 4. The method M may be performed in a processing environment as exemplarily depicted in FIG. 5.

In a first stage M1 a panoramic and time-resolved image data stream from the view to the outside of the aircraft is captured, using at least one camera C, for example an ultra wide-angle or fisheye lens camera having a viewing angle of about 180°. Then, in a stage M2, the captured image data stream is transmitted to at least one image data processor P. The image data processor P splits the image data stream into a plurality of partial image data streams corresponding to different viewing angles of the panoramic image data stream in a stage M3. Then, the plurality of partial image data streams is displayed in a stage M4 on a plurality of electronic displays S mounted to an inside of a fuselage H of the aircraft A so that the physical mounting location of the electronic displays in the aircraft A corresponds to the associated camera viewing angle of the displayed one of the plurality of partial image data streams.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A virtual window assembly for an airborne vehicle, comprising:
    at least one camera configured to capture a panoramic and time-resolved image data stream from a view to an outside of the airborne vehicle;
    at least one image data processor coupled to the at least one camera and configured to receive the captured image data stream and to split the image data stream into a plurality of partial image data streams corresponding to different viewing angles of the panoramic image data stream, wherein the image data processor is configured to generate the plurality of partial image data streams with an overlap in viewing angles of the panoramic image data stream;
    a plurality of data distribution units coupled to the image data processor and configured to distribute digital data information for cabin management functions through a cabin of the airborne vehicle; and
    a plurality of electronic displays mounted to an inside of a hull of the airborne vehicle, coupled to the image data processor via the data distribution units and connected in a daisy-chain topology and configured to receive the plurality of partial image data streams,
    wherein each of the plurality of electronic displays is configured to display one of the plurality of partial image data streams so that a physical mounting location of the electronic displays in the airborne vehicle corresponds to an associated camera viewing angle of the displayed one of the plurality of partial image data streams, and
    wherein the plurality of electronic displays is configured to display stitched partial image data streams that are stitched using the overlaps in viewing angles of the panoramic image data stream.

2. The virtual window assembly of claim 1 wherein the at least one camera comprises an ultra wide-angle lens camera having an angle of view of approximately 180°.

3. The virtual window assembly of claim 1 wherein the plurality of electronic displays comprises first displays mounted along the side walls of the hull.

4. The virtual window assembly of claim 3 wherein the plurality of electronic displays comprise second displays mounted with a viewing direction against a flying direction of the airborne vehicle.

5. The virtual window assembly of claim 1 wherein each display of the plurality of electronic displays includes a local image data processor configured to perform real-time image stitching between two of the partial image data streams.

6. The virtual window assembly of claim 1 wherein the camera comprises a plurality of sensor regions and the image data processor is configured to receive the captured image data stream and to split the image data stream by selectively reading out captured image data from the sensor regions such that each partial image data stream corresponds to a sensor region.

7. The virtual window assembly of claim 1 wherein the image data processor is integrated into a display module of one of the plurality of electronic displays.

8. An aircraft comprising a virtual window assembly, the virtual window assembly comprising:
    at least one camera configured to capture a panoramic and time-resolved image data stream from a view to an outside of the airborne vehicle;
    at least one image data processor coupled to the at least one camera and configured to receive the captured image data stream and to split the image data stream into a plurality of partial image data streams corresponding to different viewing angles of the panoramic image data stream, wherein the image data processor is configured to generate the plurality of partial image data streams with an overlap in viewing angles of the panoramic image data stream;
    a plurality of data distribution units coupled to the image data processor and configured to distribute digital data information for cabin management functions through a cabin of the airborne vehicle; and
    a plurality of electronic displays mounted to an inside of a hull of the airborne vehicle, coupled to the image data processor via the data distribution units and connected in a daisy-chain topology and configured to receive the plurality of partial image data streams,
    wherein each of the plurality of electronic displays is configured to display one of the plurality of partial image data streams so that a physical mounting location of the electronic displays in the airborne vehicle corresponds to the associated camera viewing angle of the displayed one of the plurality of partial image data streams, and
    wherein the plurality of electronic displays is configured to display stitched partial image data streams that are stitched using the overlaps in viewing angles of the panoramic image data stream.

9. The aircraft of claim 8 wherein the image data processor is integrated into a flight attendant control panel of the aircraft.

10. The aircraft of claim 8 wherein each display of the plurality of electronic displays includes a local image data processor configured to perform real-time image stitching between two of the partial image data streams.

11. The aircraft of claim 8 further comprising:
    at least one window formed in a fuselage of the aircraft; and
    an opaque window cover installed in the window with the at least one camera being arranged in a throughhole of the window cover.

12. A method for displaying a view of the outside of an aircraft to passengers within the aircraft, the method comprising:
    capturing a panoramic and time-resolved image data stream from a view to an outside of the aircraft using at least one camera;

transmitting the captured image data stream to at least one image data processor;

splitting, by the at least one image data processor the image data stream into a plurality of partial image data streams corresponding to different viewing angles of the panoramic image data stream, including generating the plurality of partial image data streams with an overlap in viewing angles of the panoramic image data stream; and displaying the plurality of partial image data streams on a plurality of electronic displays connected in a daisy-chain topology and mounted to an inside of a hull of the airborne vehicle so that a physical mounting location of the electronic displays in the airborne vehicle corresponds to the associated camera viewing angle of the displayed one of the plurality of partial image data streams, including transmitting the plurality of partial image data streams to the electronic displays via a plurality of data distribution units coupled to the image data processor and configured to distribute digital data information for cabin management functions through a cabin of the airborne vehicle, wherein displaying the plurality of partial image data streams comprises displaying stitched partial image data streams that are stitched using the overlaps in viewing angles of the panoramic image data stream.

13. The method of claim 12 wherein the at least one camera comprises an ultra wide-angle lens camera having an angle of view of approximately 180°.

* * * * *